(12) United States Patent
McAnally et al.

(10) Patent No.: US 12,169,139 B2
(45) Date of Patent: Dec. 17, 2024

(54) DETERMINING A DAMPING OF A METER ASSEMBLY

(71) Applicant: MICRO MOTION, INC., Boulder, CO (US)

(72) Inventors: Craig B. McAnally, Thornton, CO (US); Bert J. Downing, Longmont, CO (US)

(73) Assignee: MICRO MOTION, INC., Boulder, CO (US)

( * ) Notice: Subject to any disclaimer, the term of this patent is extended or adjusted under 35 U.S.C. 154(b) by 141 days.

(21) Appl. No.: 17/265,631

(22) PCT Filed: Aug. 13, 2018

(86) PCT No.: PCT/US2018/046526
§ 371 (c)(1),
(2) Date: Feb. 3, 2021

(87) PCT Pub. No.: WO2020/036584
PCT Pub. Date: Feb. 20, 2020

(65) Prior Publication Data
US 2021/0302213 A1    Sep. 30, 2021

(51) Int. Cl.
*G01F 1/84*    (2006.01)
(52) U.S. Cl.
CPC .......... *G01F 1/8436* (2013.01); *G01F 1/8431* (2013.01); *G01F 1/8477* (2013.01)
(58) Field of Classification Search
CPC .............................. G01F 1/8431; G01F 1/8436
See application file for complete search history.

(56) References Cited

U.S. PATENT DOCUMENTS

| | | | |
|---|---|---|---|
| 5,926,096 A | 7/1999 | Mattar et al. | |
| 7,865,318 B2 * | 1/2011 | Rensing ................. | G01N 9/002 702/56 |
| 9,109,936 B2 | 8/2015 | Drahm et al. | |

(Continued)

FOREIGN PATENT DOCUMENTS

| | | |
|---|---|---|
| DE | 102018101923 A1 | 5/2019 |
| RU | 2008115465 A | 10/2009 |
| WO | 2007040468 A1 | 4/2007 |

*Primary Examiner* — Erika J. Villaluna
(74) *Attorney, Agent, or Firm* — The Ollila Law Group LLC (57) ABSTRACT

A meter electronics (20) for determining a damping of a meter assembly (10) of a flow meter (5) is provided. The meter electronics (20) includes an interface (201) for receiving a vibrational response from a meter assembly (10), the vibrational response comprising a response to an excitation of the meter assembly (10) at a substantially resonant frequency, and a processing system (203) in communication with the interface (201). The processing system (203) is configured to receive the vibrational response from the interface (201) and measure a plurality of response voltages (V) of the vibrational response, the plurality of response voltages (V) including at least one of one or more decay sections (430a, 530a-530f) and one or more rising sections (430b, 630a-630f). The processing system (203) is also configured to determine an aggregate damping-related value of the meter assembly (10) based on at least one of the one or more decay sections (430a, 530a-530f) and the one or more rising sections (430b, 630a-630f).

16 Claims, 7 Drawing Sheets

(56) References Cited

U.S. PATENT DOCUMENTS

| | | | |
|---|---|---|---|
| 2001/0045134 A1* | 11/2001 | Henry | G01F 1/74 |
| | | | 73/861.356 |
| 2005/0241372 A1 | 11/2005 | Drahm et al. | |
| 2008/0184813 A1 | 8/2008 | Patten et al. | |
| 2011/0178738 A1 | 7/2011 | Rensing et al. | |
| 2011/0277559 A1 | 11/2011 | Miyaji et al. | |
| 2016/0320227 A1 | 11/2016 | Cunningham et al. | |
| 2018/0209831 A1 | 7/2018 | Rensing | |
| 2021/0018416 A1 | 1/2021 | Hollingsworth | |

* cited by examiner

DETERMINING A DAMPING OF A METER ASSEMBLY

TECHNICAL FIELD

The present invention relates generally to meter verification and, more particularly, to determining a damping of a meter assembly.

BACKGROUND

Vibrating conduit sensors, such as Coriolis mass flow meters or vibrating tube densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness, and damping characteristics of the containing conduit and the material contained therein.

A conduit of a vibratory flow meter can include one or more flow tubes. A flow tube is forced to vibrate at a resonant frequency, where the resonant frequency of the tube is proportional to the density of the fluid in the flow tube. Sensors located on the inlet and outlet sections of the tube measure the relative vibration between the ends of the tube. During flow, the vibrating tube and the flowing mass couple together due to Coriolis forces, causing a phase shift in the vibration between the ends of the tube. The phase shift is directly proportional to the mass flow.

A typical Coriolis mass flow meter includes one or more conduits that are connected inline in a pipeline or other transport system and convey material, e.g., fluids, slurries and the like, in the system. Each conduit may be viewed as having a set of natural vibration modes including, for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation by cabling. The instrumentation receives signals from the two pickoff sensors and processes the signals in order to derive a mass flow rate measurement.

The phase difference between the two sensor signals is related to the mass flow rate of the material flowing through the flow tube or flow tubes. The mass flow rate of the material is proportional to the time delay between the two sensor signals, and the mass flow rate can therefore be determined by multiplying the time delay by a Flow Calibration Factor (FCF), where the time delay comprises a phase difference divided by frequency. The FCF reflects the material properties and cross-sectional properties of the flow tube. In the prior art, the FCF is determined by a calibration process prior to installation of the flow meter into a pipeline or other conduit. In the calibration process, a fluid is passed through the flow tube at a given flow rate and the proportion between the phase difference and the flow rate is calculated.

One advantage of a Coriolis flow meter is that the accuracy of the measured mass flow rate is not affected by wear of moving components in the flow meter. The flow rate is determined by multiplying the phase difference between two points of the flow tube and the flow calibration factor. The only input is the sinusoidal signals from the sensors, indicating the oscillation of two points on the flow tube. The phase difference is calculated from these sinusoidal signals. There are no moving components in the vibrating flow tube. Therefore, the measurement of the phase difference and the flow calibration factor are not affected by wear of moving components in the flow meter.

The FCF can be related to a stiffness, damping, and mass attributes of the meter assembly. If the attributes of the meter assembly change, then the FCF may also change. Changes in the attributes will therefore affect the accuracy of the flow measurements generated by the flow meter. Changes in the attributes may be due to changes in the material and cross-sectional properties of a flow tube, which can be caused by erosion or corrosion, for example. Consequently, it is highly desirable to be able to detect and/or quantify any changes to the attributes, such as the damping attribute, of the meter assembly in order to maintain a high level of accuracy in the flow meter.

The damping attribute can be detected and/or quantified by determining a damping characteristic of the meter assembly. The damping characteristic can be determined by allowing the vibration response of the meter assembly to decay and measuring the sensor signals during the decay. However, noise may be present in the sensor signals. The noise may cause the determination of the damping characteristic to be incorrect. Accordingly, there is a need for determining the damping of the meter assembly without the above discussed issues.

SUMMARY

A meter electronics for determining a damping of a meter assembly of a flow meter is provided. The meter electronics comprises an interface for receiving a vibrational response from a meter assembly, the vibrational response comprising a response to an excitation of the meter assembly at a substantially resonant frequency, and a processing system in communication with the interface. The processing system is configured to receive the vibrational response from the interface, measure a plurality of response voltages of the vibrational response, the plurality of response voltages including at least one of one or more decay sections and one or more rising sections. The processing system is also configured to determine an aggregate damping-related value of the meter assembly based on at least one of the one or more decay sections and the one or more rising sections.

A method for determining a damping of a meter assembly of a flow meter is provided. The method comprises receiving a vibrational response from a meter assembly, the vibrational response comprising a response to a vibration of the meter assembly at a substantially resonant frequency. The method further comprises receiving the vibrational response, measuring a plurality of response voltages of the vibrational response, the plurality of response voltages including at least one of one or more decay sections and one or more rising sections. The method also comprises determining an aggregate damping-related value of the meter assembly based on at least one of the one or more decay sections and the one or more rising sections.

ASPECTS

According to an aspect, a meter electronics (20) for determining a damping of a meter assembly (10) of a flow meter (5) comprises an interface (201) for receiving a vibrational response from a meter assembly (10), the vibrational response comprising a response to an excitation of the meter assembly (10) at a substantially resonant frequency, and a processing system (203) in communication with the interface (201). The processing system (203) is configured to receive the vibrational response from the interface (201), measure a plurality of response voltages (V) of the vibrational response, the plurality of response voltages (V) including at least one of one or more decay sections (430a, 530a-530f) and one or more rising sections (430b, 630a-630f), and determine an aggregate damping-related value of the meter assembly (10) based on at least one of the one or more decay sections (430a, 530a-530f) and the one or more rising sections (430b, 630a-630f).

Preferably, at least one of the one or more decay sections (430a, 530a-530f) and the one or more rising sections (430b, 630a-630f) are a cyclical response voltage plot (430, 530, 630).

Preferably, the one or more decay sections (530a-530f) are of a response voltage decay curve and the one or more rising sections (630a-630f) are of a response voltage rising curve.

Preferably, the aggregate damping-related value of the meter assembly (10) is an aggregate decay characteristic value of the meter assembly (10) based on the one or more decay sections (430a, 530a-530f).

Preferably, the processing system (203) is further configured to determine a damping characteristic based on the aggregate decay characteristic value.

Preferably, the aggregate decay characteristic value is an average of fractional decay characteristics respectively corresponding to the one or more decay sections (530a-530f).

Preferably, the aggregate damping-related value of the meter assembly (10) is an aggregate damping characteristic value of the meter assembly (10).

Preferably, the aggregate damping characteristic value of the meter assembly (10) is comprised of the average damping characteristic of the meter assembly (10).

According to an aspect, a method for determining a damping of a meter assembly of a flow meter comprises receiving a vibrational response from a meter assembly, the vibrational response comprising a response to a vibration of the meter assembly at a substantially resonant frequency. The method further comprises receiving the vibrational response, measuring a plurality of response voltages of the vibrational response, the plurality of response voltages including at least one of one or more decay sections and one or more rising sections, and determining an aggregate damping-related value of the meter assembly based on at least one of the one or more decay sections and the one or more rising sections.

Preferably, at least one of the one or more decay sections and the one or more rising sections are a cyclical response voltage plot.

Preferably, the one or more decay sections are of a response voltage decay curve and the one or more rising sections are of a response voltage rising curve.

Preferably, the aggregate damping-related value of the meter assembly is an aggregate decay characteristic value of the meter assembly based on the one or more decay sections.

Preferably, the method further comprises determining a damping characteristic based on the aggregate decay characteristic value.

Preferably, the aggregate decay characteristic value is an average of fractional decay characteristics respectively corresponding to the one or more decay sections.

Preferably, the aggregate damping-related value of the meter assembly is an aggregate damping characteristic value of the meter assembly.

Preferably, the aggregate damping characteristic value of the meter assembly is comprised of average damping characteristic of the meter assembly.

BRIEF DESCRIPTION OF THE DRAWINGS

The same reference number represents the same element on all drawings. It should be understood that the drawings are not necessarily to scale.

DETAILED DESCRIPTION

FIGS. 1-7 and the following description depict specific examples to teach those skilled in the art how to make and use the best mode of an electronics and a method to determine a damping of a meter assembly. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the electronics and methods of determining the damping of the meter assembly is not limited to the specific examples described below, but only by the claims and their equivalents.

Figure 1:
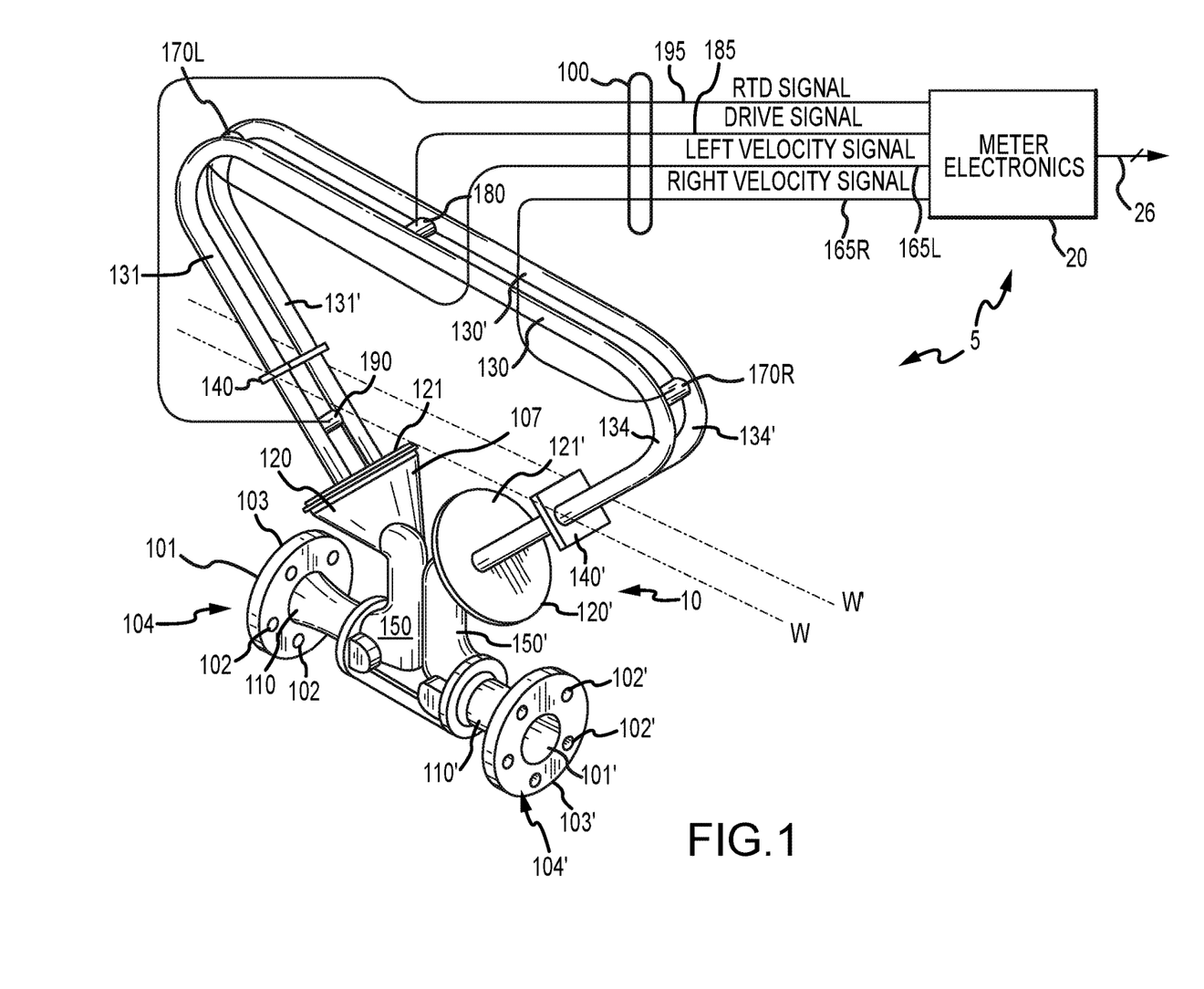
FIG. 1 shows a flow meter comprising a meter assembly and meter electronics.

FIG. 1 shows a flow meter 5 comprising a meter assembly 10 and meter electronics 20. Meter assembly 10 responds to mass flow rate and density of a process material. Meter electronics 20 is connected to meter assembly 10 via leads 100 to provide density, mass flow rate, and temperature information over path 26, as well as other information not relevant to the present invention. A Coriolis flow meter structure is described although it is apparent to those skilled in the art that the present invention could be practiced as a vibrating tube densitometer without the additional measurement capability provided by a Coriolis mass flow meter.

Meter assembly 10 includes a pair of manifolds 150 and 150', flanges 103 and 103' having flange necks 110 and 110', a pair of parallel flow tubes 130 and 130', drive mechanism 180, temperature sensor 190, and a pair of pickoff sensors 170L and 170R. Flow tubes 130 and 130' have two essentially straight inlet legs 131 and 131' and outlet legs 134 and 134' which converge towards each other at flow tube mounting blocks 120 and 120'. Flow tubes 130 and 130' bend at two symmetrical locations along their length and are essentially parallel throughout their length. Brace bars 140 and 140' serve to define the axis W and W' about which each flow tube oscillates.

The side legs 131, 131' and 134, 134' of flow tubes 130 and 130' are fixedly attached to flow tube mounting blocks 120 and 120' and these blocks, in turn, are fixedly attached to manifolds 150 and 150'. This provides a continuous closed material path through Coriolis meter assembly 10.

When flanges 103 and 103', having holes 102 and 102' are connected, via inlet end 104 and outlet end 104' into a process line (not shown) which carries the process material that is being measured, material enters end 104 of the meter through an orifice 101 in flange 103 is conducted through manifold 150 to flow tube mounting block 120 having a surface 121. Within manifold 150 the material is divided and routed through flow tubes 130 and 130'. Upon exiting flow tubes 130 and 130', the process material is recombined in a single stream within manifold 150' and is thereafter routed to exit end 104' connected by flange 103' having bolt holes 102' to the process line (not shown).

Flow tubes 130 and 130' are selected and appropriately mounted to the flow tube mounting blocks 120 and 120' so as to have substantially the same mass distribution, moments of inertia and Young's modulus about bending axes W-W and W'-W', respectively. These bending axes go through brace bars 140 and 140'. Inasmuch as the Young's modulus of the flow tubes change with temperature, and this change affects the calculation of flow and density, resistive temperature detector (RTD) 190 is mounted to flow tube 130', to continuously measure the temperature of the flow tube. The temperature of the flow tube and hence the voltage appearing across the RTD for a given current passing therethrough is governed by the temperature of the material passing through the flow tube. The temperature dependent voltage appearing across the RTD is used in a well known method by meter electronics 20 to compensate for the change in elastic modulus of flow tubes 130 and 130' due to any changes in flow tube temperature. The RTD is connected to meter electronics 20 by lead 195.

Both flow tubes 130 and 130' are driven by driver 180 in opposite directions about their respective bending axes W and W' and at what is termed the first out-of-phase bending mode of the flow meter. This drive mechanism 180 may comprise any one of many well known arrangements, such as a magnet mounted to flow tube 130' and an opposing coil mounted to flow tube 130 and through which an alternating current is passed for vibrating both flow tubes. A suitable drive signal is applied by meter electronics 20, via lead 185, to drive mechanism 180.

Meter electronics 20 receives the RTD temperature signal on lead 195, and the left and right pickoff signals appearing on leads 165L and 165R, respectively. Meter electronics 20 produces the drive signal appearing on lead 185 to drive element 180 and vibrate tubes 130 and 130'. Meter electronics 20 processes the left and right pickoff signals and the RTD signal to compute the mass flow rate and the density of the material passing through meter assembly 10. This information, along with other information, is applied by meter electronics 20 over path 26.

Figure 2:
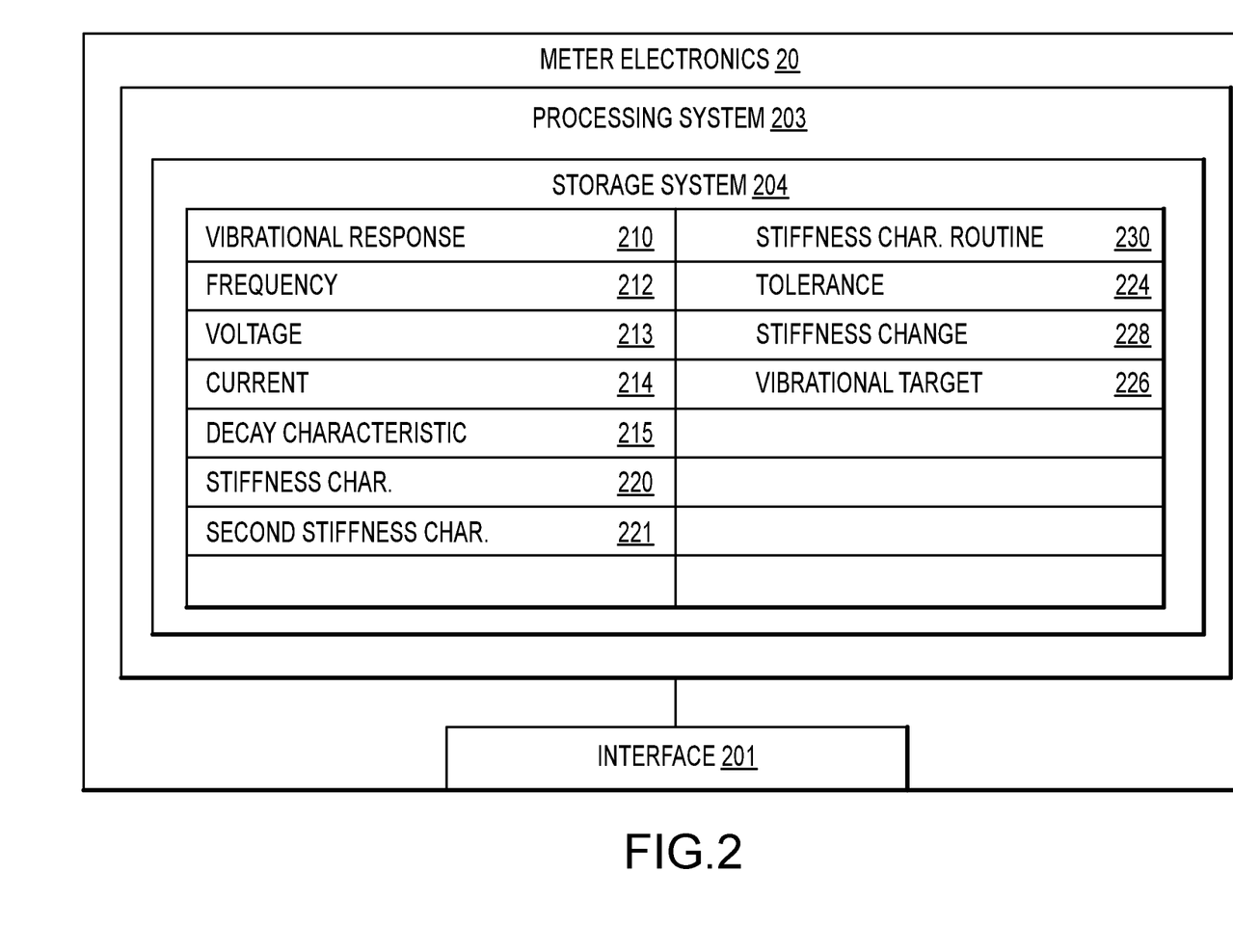
FIG. 2 shows the meter electronics 20 according to an embodiment of the invention.

FIG. 2 shows the meter electronics 20 according to an embodiment of the invention. The meter electronics 20 can include an interface 201 and a processing system 203. The meter electronics 20 receives a vibrational response 210, such as from the meter assembly 10, for example. The meter electronics 20 processes the vibrational response 210 in order to obtain flow characteristics of the flow material flowing through the meter assembly 10. In addition, in the meter electronics 20 according to the invention, the vibrational response 210 is also processed in order to determine a stiffness parameter K of the meter assembly 10. Furthermore, the meter electronics 20 can process two or more such vibrational responses, over time, in order to detect a stiffness change $\Delta K$ in the meter assembly 10. The stiffness determination can be made under flow or no-flow conditions. A no-flow determination may offer the benefit of a reduced noise level in the resulting vibrational response.

As previously discussed, the Flow Calibration Factor (FCF) reflects the material properties and cross-sectional properties of the flow tube. A mass flow rate of flow material flowing through the flow meter is determined by multiplying a measured time delay (or phase difference/frequency) by the FCF. The FCF can be related to stiffness, damping, and mass characteristics of the meter assembly. If the characteristics of the meter assembly changes, then the FCF will also change. Changes in the characteristics of the meter assembly therefore will affect the accuracy of the flow measurements generated by the flow meter.

A vibrational response of a flow meter can be represented by an open loop, second order drive model, comprising:

$$M\ddot{x}+C\dot{x}+Kx=f \quad (1)$$

where f is the force applied to the system, M is a mass of the system, C is a damping characteristic, and K is a stiffness characteristic of the system. The stiffness characteristic K comprises $K=M(\omega_0)^2$ and the damping characteristic C comprises $C=M2\zeta\omega_0$ where ζ comprises a decay characteristic, and $\omega_0=2\pi f_0$ where $f_0$ is the natural/resonant frequency of the meter assembly 10 in Hertz. In addition, x is the physical displacement distance of the vibration, $\dot{x}$ is the velocity of the flowtube displacement, and $\ddot{x}$ is the acceleration. This is commonly referred to as the MCK model. This formula can be rearranged into the form:

$$M[s^2+2\zeta\omega_0 s+\omega_0^2]x=f. \quad (2)$$

Equation (2) can be further manipulated into a transfer function form. In the transfer function form, a term of displacement over force is used, comprising:

$$\frac{x}{f} = \frac{s}{M[s^2 + 2\zeta\omega_0 s + \omega_0^2]}. \quad (3)$$

Well-known magnetic equations can be used to simplify equation (3). Two applicable equations are:

$$V_{EMF}=BL_{PO}*\dot{x}, \quad (4)$$

and;

$$f=BL_{DR}*I. \quad (5)$$

The sensor voltage $V_{EMF}$ of equation (4) (at a pickoff sensor 170L or 170R) is equal to the pickoff sensitivity factor $BL_{PO}$ multiplied by the pickoff velocity of motion $\dot{x}$. The pickoff sensitivity factor $BL_{PO}$ is generally known or measured for each pickoff sensor. The force (f) generated by the driver 180 of equation (5) is equal to the driver sensitivity factor $BL_{DR}$ multiplied by the drive current (I) supplied to the driver 180. The driver sensitivity factor $BL_{DR}$ of the driver 180 is generally known or measured. The factors $BL_{PO}$ and $BL_{DR}$ are both a function of temperature, and can be corrected by a temperature measurement.

By substituting the magnetic equations (4) and (5) into the transfer function of equation (3), the result is:

$$\frac{V}{I} = \frac{BL_{PO} * BL_{DR} * s}{M[s^2 + 2\zeta\omega_0 s + \omega_0^2]}. \tag{6}$$

If the meter assembly 10 is driven open loop on resonance, i.e., at a resonant/natural frequency $\omega_0$ (where $\omega_0 = 2\pi f_0$), then equation (6) can be rewritten as:

$$\left(\frac{V}{I}\right)_{\omega_0} = \frac{BL_{PO} * BL_{DR} * \omega_0}{2\zeta M \omega_0^2}. \tag{7}$$

By substituting for stiffness, equation (7) is simplified to:

$$\left(\frac{V}{I}\right)_{\omega_0} = \frac{BL_{PO} * BL_{DR} * \omega_0}{2\zeta K}. \tag{8}$$

Here, the stiffness parameter K can be isolated in order to obtain:

$$K = \frac{I * BL_{PO} * BL_{DR} * \omega_0}{2\zeta V}. \tag{9}$$

As a consequence, by measuring/quantifying the decay characteristic $\zeta$, along with the drive voltage V and drive current I, the stiffness parameter K can be determined. The response voltage V from the pickoffs can be determined from the vibrational response, along with the drive current. The process of determining the stiffness parameter K is discussed in more detail in conjunction with FIG. 3, below.

In use, the stiffness parameter K can be tracked over time. For example, statistical techniques can be used to determine any changes over time (i.e., a stiffness change $\Delta K$). A statistical change in the stiffness parameter K can indicate that the FCF for the particular flow meter has changed. As can be observed from equation (9), the stiffness parameter may be determined based on the decay characteristic $\zeta$.

A proportionally damped system may decay exponentially as a function of time t as given by equation (10)

$$\eta(t) = A e^{-\zeta\omega_n t}, \tag{10}$$

where $\eta$ is the time decaying modal magnitude, A is the initial amplitude, $\zeta$ is the decay characteristic (sometimes referred to as proportional damping coefficient, etc.), and $\omega_n$, is the natural frequency.

A modal magnitude can be thought of as an average of the right and left pickoffs. The averaging process may amplify a drive mode (also referred to as a first out-of-phase bend mode) and attenuates the other modes (e.g., twist modes, second order or higher bend modes, etc.). Since damping is a global modal property, using the modal magnitude may be advantageous over, for example, using either the right or left pickoff to estimate damping.

To determine the decay characteristic $\zeta$, equation (10) may be linearized in time by taking the natural logarithm of both sides:

$$\ln(\eta) = (-\zeta\omega_n)t + \ln(A). \tag{11}$$

Equation (11) is linear in time with slope $-\zeta\omega_n$ and intercept $\ln(A)$. Equation (11) can be solved in a straightforward least squares manner by taking n samples of the modal magnitude $\eta$ at the corresponding times t.

$$\begin{Bmatrix} \ln(\eta(t_1)) \\ \vdots \\ \ln(\eta(t_n)) \end{Bmatrix} = \begin{bmatrix} t_1 & 1 \\ \vdots & \vdots \\ t_n & 1 \end{bmatrix} \begin{Bmatrix} -\zeta\omega_n \\ \ln(A) \end{Bmatrix}. \tag{12}$$

Equation (12) is solved by premultiplying the vector containing the log of the modal responses by the pseudo inverse of the basis vectors consisting of the sample times $t_1 \ldots t_n$ augmented by a vector of ones. The result is a least squares estimate quantities of interest, damping and the intercept.

$$\begin{Bmatrix} -\zeta\omega_n \\ \ln(A) \end{Bmatrix} = \begin{bmatrix} t_1 & 1 \\ \vdots & \vdots \\ t_n & 1 \end{bmatrix}^{-1} \begin{Bmatrix} \ln(\eta(t_1)) \\ \vdots \\ \ln(\eta(t_n)) \end{Bmatrix}$$

A gain decay meter verification method may rely on an accurate curve fit of the decaying pickoff voltage to determine the decay characteristic $\zeta$. The calculation for the decay characteristic $\zeta$ may be performed by cutting drive current, thereby removing an excitation of the meter assembly 10, and measuring the pickoff voltage as a vibrational response decays naturally from a start response voltage to a stop response voltage. The start response voltage may be based on an amplitude of the vibration when vibrating at the resonant frequency. The stop response voltage may be at or about zero volts, although any suitable amplitude or unit may be employed.

Sampling for the pickoff voltage to determine a decay curve may begin when the pickoff voltage goes below a start response voltage threshold and stops when it reaches a stop response voltage threshold. An exponential least squares curve fit may then be applied to the curve to determine an exponential function that best describes the data, although any suitable data fitting, function, or form of data may be employed. Accordingly, the decay characteristic may be measured from the start response voltage threshold, which may be less than the start response voltage, to the stop response voltage threshold, which may be greater than the stop response voltage.

The start response voltage threshold and stop response voltage threshold are a function of the vibratory meter (e.g., geometry, size, configuration, etc.), the drive target at which the vibratory meter is operating, a material density and viscosity, and temperature. However, nonlinearities in the meter electronics 20 and/or the meter assembly 10 can result in different decay characteristic $\zeta$ values when the start and/or stop response voltage thresholds for pickoff voltages sampled during the decay are changed. These nonlinearities can result in a change in stiffness when no mechanical change in the meter assembly 10 has occurred.

The interface 201 receives the vibrational response 210 from one of the pickoff sensors 170L and 170R via the leads 100 of FIG. 1. The interface 201 can perform any necessary or desired signal conditioning, such as any manner of formatting, amplification, buffering, etc. Alternatively, some or all of the signal conditioning can be performed in the processing system 203. In addition, the interface 201 can enable communications between the meter electronics 20 and external devices. The interface 201 can be capable of any manner of electronic, optical, or wireless communication.

The interface 201 in one embodiment is coupled with a digitizer (not shown), wherein the sensor signal comprises an analog sensor signal. The digitizer samples and digitizes an analog vibrational response and produces the digital vibrational response 210.

The processing system 203 conducts operations of the meter electronics 20 and processes flow measurements from the flow meter assembly 10. The processing system 203 executes one or more processing routines and thereby processes the flow measurements in order to produce one or more flow characteristics.

The processing system 203 can comprise a general purpose computer, a microprocessing system, a logic circuit, or some other general purpose or customized processing device. The processing system 203 can be distributed among multiple processing devices. The processing system 203 can include any manner of integral or independent electronic storage medium, such as the storage system 204.

The storage system 204 can store flow meter parameters and data, software routines, constant values, and variable values. In one embodiment, the storage system 204 includes routines that are executed by the processing system 203, such as stiffness characteristic routine 230 that determines the stiffness characteristic of the flow meter 5.

The stiffness characteristic routine 230 can configure the processing system 203 to receive a vibrational response from the meter assembly 10. The vibrational response may be received by the interface 201. The vibrational response may comprise a response to an excitation of the meter assembly 10 at a substantially resonant frequency.

The storage system 204 may stores variables used to operate the flow meter 5. For example, the storage system 204 may store variables such as the vibrational response 210, which can be received from the velocity/pickoff sensors 170L and 170R, for example.

In one embodiment, the storage system 204 stores constants, coefficients, and working variables. For example, the storage system 204 can store a determined stiffness characteristic 220 and a second stiffness characteristic 221 that is generated at a later point in time. The storage system 204 can store working values such as a frequency 212 of the vibrational response 210, a response voltage 213 of the vibrational response 210, and a drive current 214.

The storage system 204 can further store a vibrational target 226 and a measured decay characteristic 215 of the flow meter 5. In addition, the storage system 204 can store constants, thresholds, or ranges, such as the tolerance 224. Moreover, the storage system 204 can store data accumulated over a period of time, such as the stiffness change 228.

Figure 3:
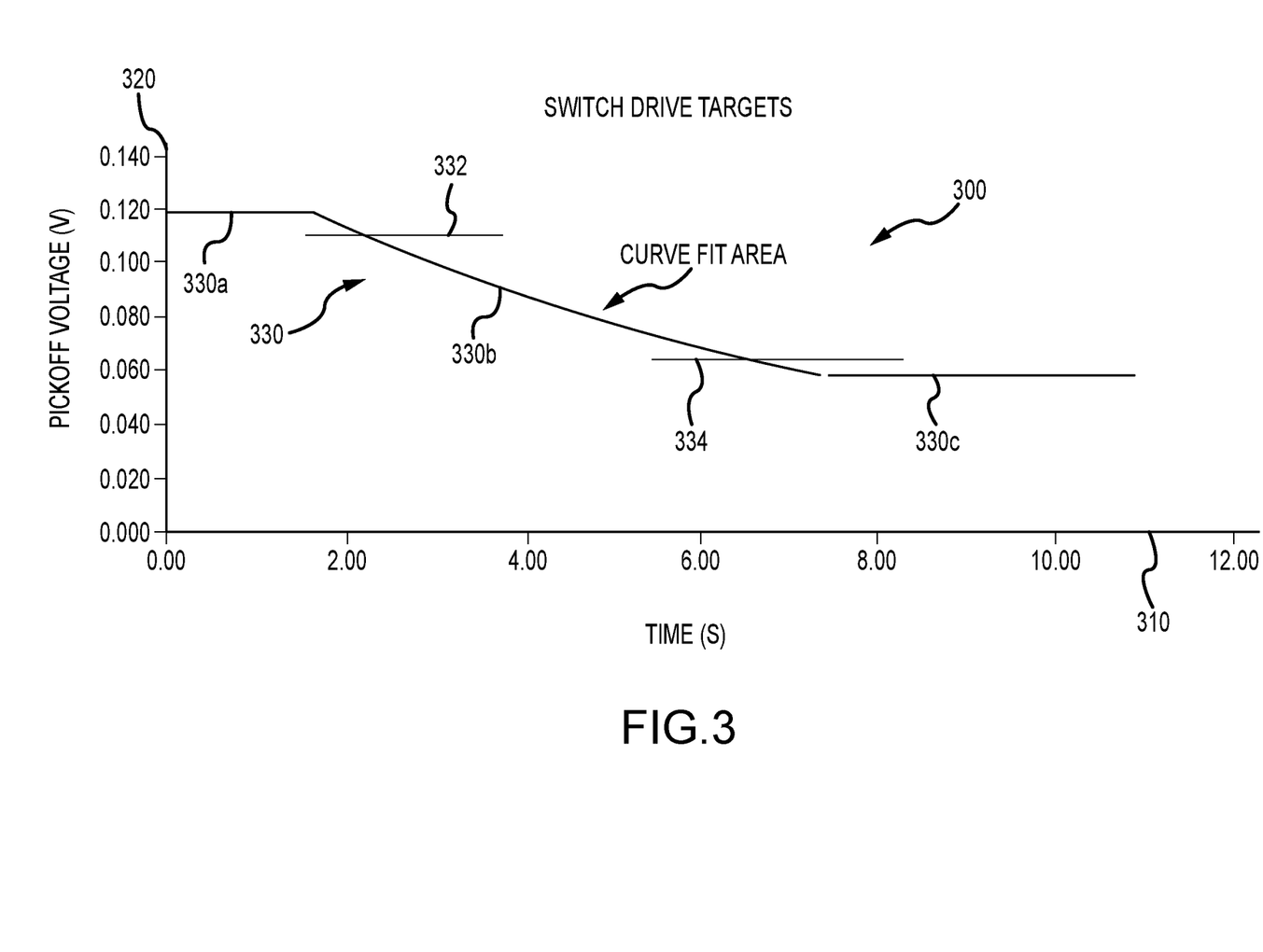
FIG. 3 shows a graph 300 that shows a pickoff voltage relative to time during a vibrational decay.

FIG. 3 shows a graph 300 that shows a pickoff voltage relative to time during a vibrational decay. As shown in FIG. 3, the graph 300 includes a time axis 310 and a pickoff voltage axis 320. The time axis 310 is in units of seconds and the pickoff voltage axis 320 is in units of volts, although any suitable units may be employed. The time axis 310 ranges from 0.00 to 12.00 seconds and the pickoff voltage axis 320 ranges from 0.000 to 0.140 volts, although any suitable ranges may be employed. The graph 300 also includes a pickoff voltage plot 330 that ranges from 0.00 to about 12.00 seconds along the time axis 310 and 0.060 to about 0.120 volts along the pickoff voltage axis 320.

As shown in FIG. 3, the pickoff voltage plot 330 is comprised of a first drive target section 330a, a decay section 330b, and a second drive target section 330c. The first drive target section 330a is at about 0.120 volts and the second drive target section 330c is at about 0.060 volts. The decay section 330b includes a start response voltage threshold 332 and a stop response voltage threshold 334. The start response voltage threshold 332 is at about 0.110 volts, which is less than the 0.120 volts of the first drive target section 330a. The stop response voltage threshold 334 is at about 0.065 volts, which is greater than the second drive target section 330c of 0.060 volts.

As the pickoff voltage plot 330 decreases from the first drive target section 330a voltage value of 0.120 volts to the second drive target section 330c voltage value of 0.060 volts, the voltage traverses the start response voltage threshold 332 and the stop response voltage threshold 334. The response voltage may be measured, sampled, or the like, between the start response voltage threshold 332 and the stop response voltage threshold 334 of the decay section 330b. Accordingly, the measured response voltage may not represent the entire decay section 330b.

The decay characteristic $\zeta$ may be more repeatable if the measurements made between the start response voltage threshold 332 and the stop response voltage threshold 334 are performed multiple times. For example, a plurality of sequential measurements may be made between the start response voltage threshold 332 and the stop response voltage threshold 334. For example, subsequent to the pickoff voltage plot 330 reaching the second drive target section 330c, a target voltage may be set to about the same as the first drive target section 330a's value of 0.120 volts. After the pickoff voltage reaches the value of 0.120 volts, the target voltage may be reduced to 0.060 volts, thereby allowing the pickoff voltage to decay to 0.060 volts.

The decay characteristic $\zeta$ may also be more repeatable if, for example, the start response voltage threshold 332 and the stop response voltage threshold 334 have a smaller difference. For example, the stop response voltage threshold 334 may be at about 0.10 volts (instead of 0.060). As a result, the decay section 330b may be shorter along both the time axis 310 and the pickoff voltage axis 320. That is, the measurements made between the start response voltage threshold 332 and the stop response voltage threshold 334 may be over a shorter duration. Due to the shorter duration, the decay characteristic $\zeta$ may be less likely to include noise, or the like. An exemplary plot that includes multiple shorter duration measurements is discussed in the following.

Figure 4:
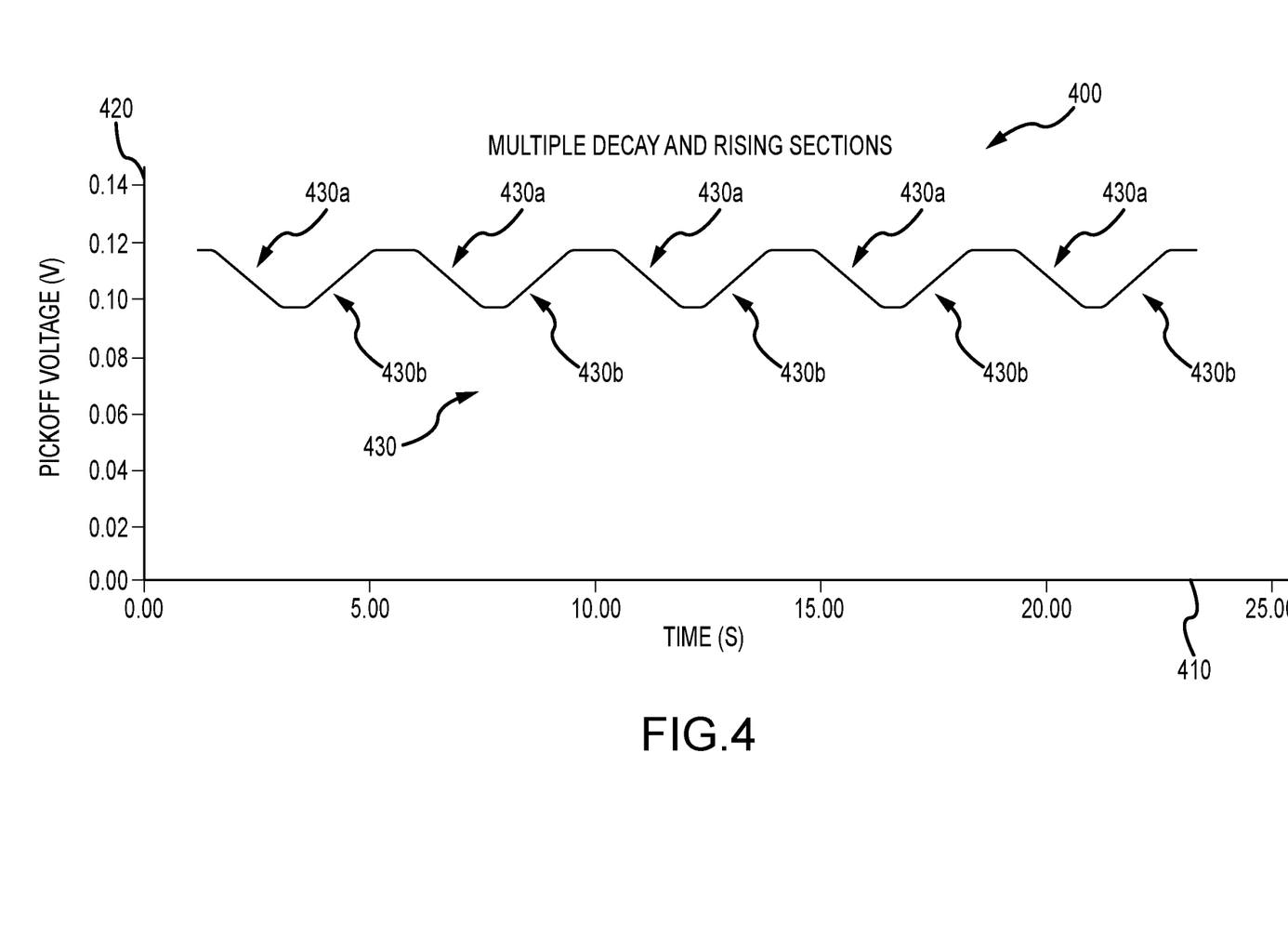
FIG. 4 shows a graph 400 illustrating multiple response voltage decay and rising sections.

FIG. 4 shows a graph 400 illustrating multiple response voltage decay and rising sections. As shown in FIG. 4, the graph 400 includes a time axis 410 and a pickoff voltage axis 420. The time axis 410 is in units of seconds and the pickoff voltage axis 420 is in units of volts, although any suitable units may be employed. The time axis 410 ranges from 0.00 to 25.00 seconds and the pickoff voltage axis 420 ranges from 0.000 to 0.140 volts, although any suitable ranges may be employed. The graph 400 also includes a response voltage plot 430 that ranges from 2.00 to about 23.00 seconds along the time axis 410 and 0.100 to about 0.120 volts along the pickoff voltage axis 420.

The response voltage plot 430 may be obtained by measuring a plurality of response voltages of, for example, a vibrational response of the meter assembly 10 described above. The response voltage plot 430 includes a plurality of decay sections 430a. The plurality of decay sections 430a can be measured and then, for example, averaged to determine an average decay characteristic $\zeta_{avg}$. Although five decay sections 430a are shown, more or fewer decay sections may be utilized. Additionally or alternatively, the decay characteristic $\zeta$ may be determined based on measurements averaged over fewer than the total number of decay cycles. For example, three of the decay sections 430a may be used to determine a decay characteristic. In one example, the first three of the plurality of decay sections 430a may be used.

The response voltage plot 430 also includes rising sections 430b where the response voltage plot 430 increases from about 0.100 to 0.120 volts. The rising section 430b may be due to a voltage set point being increased from 0.100 to 0.120. The time required to reach the increased voltage set point is related to damping. For example, the time required for a vibration to increase from 0.100 to 0.120 volts may be correlated with the damping. Accordingly, the damping characteristic C, or its factors, or another term derived from or related to the damping characteristic C may be determined from the rising sections 430b.

Figure 5:
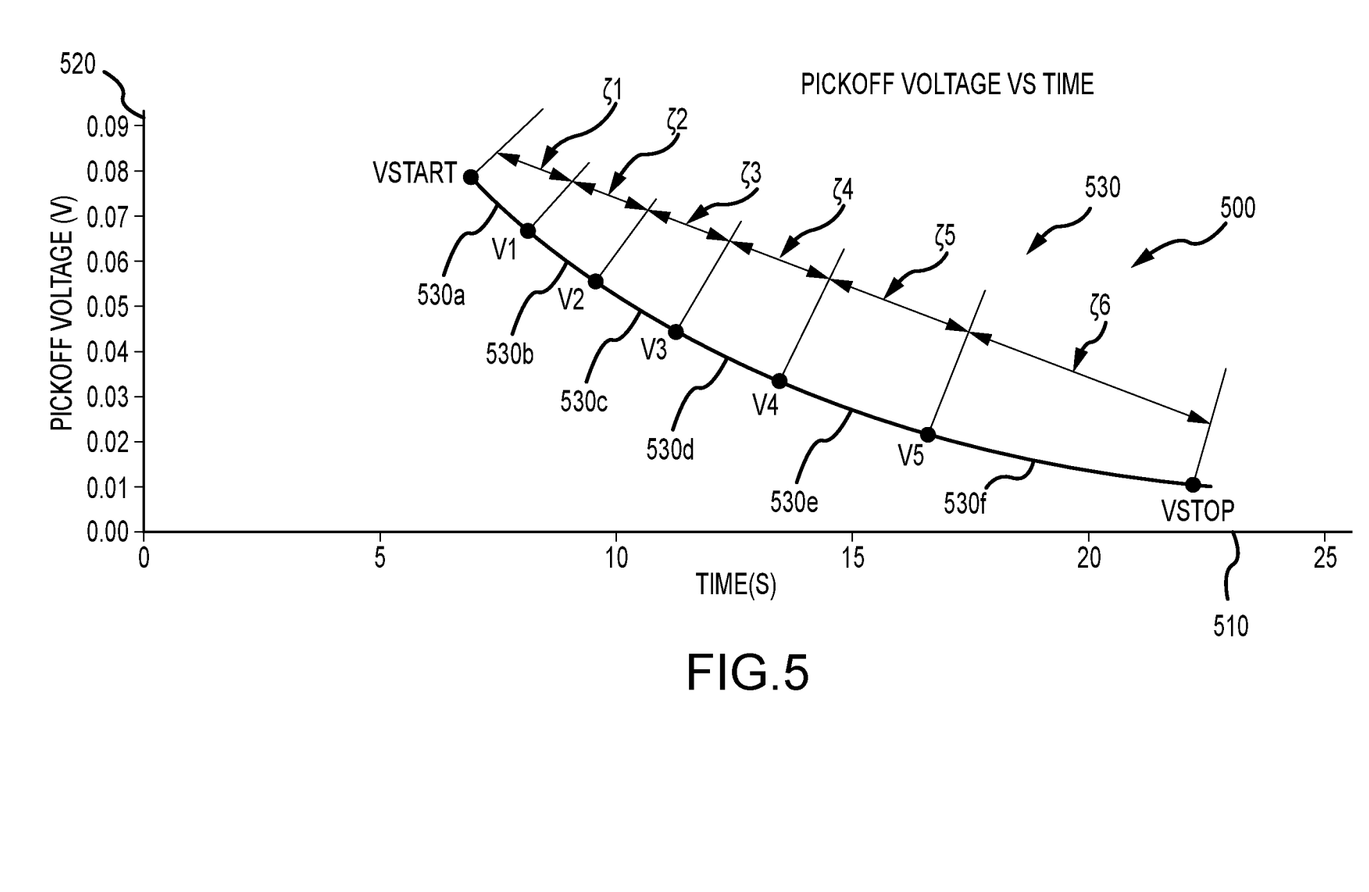
FIG. 5 shows a graph 500 illustrating a response voltage decay with multiple decay sections.

FIG. 5 shows a graph 500 illustrating a response voltage decay with multiple decay sections. As shown in FIG. 5, the graph 500 includes a time axis 510 and a pickoff voltage axis 520. The time axis 510 is in units of seconds and the pickoff voltage axis 520 is in units of volts. The time axis 510 ranges from about 0 to 25 seconds and the pickoff voltage axis 520 ranges from about 0.00 volts to about 0.09 volts. The graph 500 also includes a response voltage plot 530 that relates response voltages (e.g., pickoff voltages) with time.

The response voltage plot 530 ranges on the time axis 510 from about 7 seconds to about 22 seconds, although any suitable range may be employed. The response voltage plot 530 ranges on the pickoff voltage axis 520 from about 0.01 volts to about 0.08 volts. The response voltage plot 530 includes a start response voltage Vstart and a stop response voltage Vstop. The response voltage plot 530 also includes a first through fifth stop response voltage thresholds V1-V5. The first through fifth stop response voltage thresholds V1-V5 and stop response voltage Vstop respectively correspond to a first through sixth decay section 530a-530f of the response voltage plot 530.

As shown, the first through fifth response voltage thresholds V1-V5, as well as the start response voltage Vstart and stop response voltage Vstop, are used to determine a corresponding fractional decay characteristic. For example, a first fractional decay characteristic $\zeta_1$ corresponds to the response voltage plot 530 ranging from the start response voltage Vstart to the first stop response voltage threshold V1. Similarly, the second through fifth fractional decay characteristic $\zeta_2$-$\zeta_5$ respectively correspond to the second through fifth response voltage thresholds V2-V5 relative to an adjacent response voltage (e.g., the first response voltage V1 and the third response voltage V3 are adjacent to the second response voltage V2).

An average damping characteristic $\zeta_{avg}$ can be determined for the response voltage plot 530. For example, the first through sixth damping characteristic $\zeta_1$-$\zeta_6$ can be averaged to the average damping characteristic $\zeta_{avg}$. However, any suitable number of damping characteristics may be employed to determine the average damping characteristic $\zeta_{avg}$.

Accordingly, noise in the first through sixth decay sections 530a-530f of the response voltage plot 530 may not adversely affect the average damping characteristic $\zeta_{avg}$ as significantly as the noise adversely affects the damping characteristics corresponding to the first through sixth decay sections 530a-530f having the noise. That is, noise that may be present in the response voltage plot 530 is averaged out. As a result, although the average damping characteristic $\zeta_{avg}$ may be adversely affected by noise, the average damping characteristic $\zeta_{avg}$ may be more repeatable than, for example, the first through sixth fractional decay characteristic $\zeta_1$-$\zeta_6$.

Figure 6:
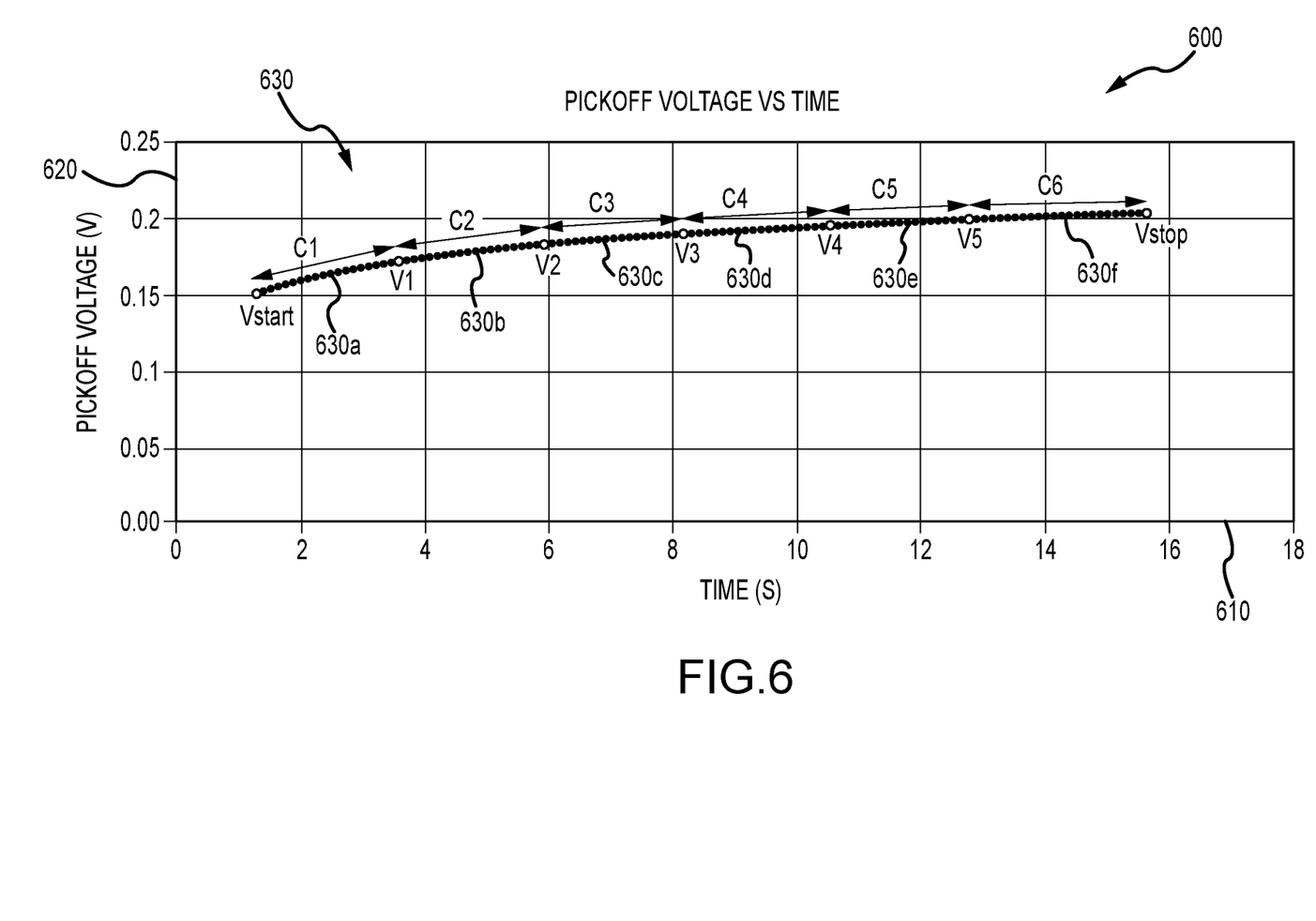
FIG. 6 shows a graph 600 illustrating a response voltage rise with multiple rise sections.

FIG. 6 shows a graph 600 illustrating a response voltage rise with multiple rise sections. As shown in FIG. 6, the graph 600 includes a time axis 610 and a pickoff voltage axis 620. The time axis 610 is in units of seconds and the pickoff voltage axis 620 is in units of volts. The time axis 610 ranges from about 0 to 18 seconds and the pickoff voltage axis 620 ranges from about 0.00 volts to about 0.25 volts. The graph 600 also includes a response voltage plot 630 that relates response voltages (e.g., pickoff voltages) with time.

The response voltage plot 630 ranges on the time axis 610 from about 1.5 seconds to about 15.5 seconds, although any suitable range may be employed. The response voltage plot 630 ranges on the pickoff voltage axis 620 from about 0.15 volts to about 0.2 volts. The response voltage plot 630 includes a start response voltage Vstart and a stop response voltage Vstop. The response voltage plot 630 also includes a first through fifth stop response voltage thresholds V1-V5. The first through fifth stop response voltage thresholds V1-V5 and the stop response voltage Vstop respectively correspond to a first through sixth rise section 630a-630f of the response voltage plot 630.

As shown, the first through fifth response voltage thresholds V1-V5, as well as the start response voltage Vstart and stop response voltage Vstop, are used to determine a corresponding fractional damping characteristic. For example, a first fractional damping characteristic C1 corresponds to the response voltage plot 630 ranging from the start response voltage Vstart to the first stop response voltage threshold V1. Similarly, the second through fifth fractional damping characteristic C2-C5 respectively correspond to the second through fifth stop response voltage thresholds V2-V5 relative to an adjacent response voltage (e.g., the first response voltage threshold V1 and the third response voltage threshold V3 are adjacent to the second response voltage threshold V2).

An average damping characteristic Cavg can be determined for the response voltage plot 630. For example, the first through sixth damping characteristic C1-C6 can be averaged to the average damping characteristic Cavg. However, any suitable number of damping characteristics may be employed to determine the average damping characteristic Cavg.

Accordingly, noise in the first through sixth rising sections 630a-630f of the response voltage plot 630 may not adversely affect the average damping characteristic Cavg as significantly as the noise adversely affects the damping characteristics corresponding to the rising sections having the noise. That is, noise that may be present in the response voltage plot 630 is averaged out. As a result, although the average damping characteristic Cavg may be adversely affected by noise, the average damping characteristic Cavg may be more repeatable than, for example, the first through sixth damping characteristic C1-C6.

As discussed above with reference to equations (1) through (3), the decay characteristic $\zeta$ can be used to determine the damping characteristic C. The decay characteristic $\zeta$ and damping characteristic C can also be determined from each other. For example, the decay characteristic $\zeta$ can be multiplied with the resonant frequency $\omega_0$ to determine the damping characteristic C. The decay characteristic $\zeta$ and damping characteristic C may be related to the damping of, for example, the flow tubes 130, 130'. Accordingly, the decay characteristic $\zeta$ and the damping characteristic C may be damping-related values of, for example, the meter assembly 10 described above. Other damping-related values may be employed.

For the rising sections 430*b*, 630*a*-630*f*, the target voltage may be set to a value that is greater than a prior value. The pickoff voltage, for example, of the resulting rising section 430*b* may be measured and characterized to determine a rising-based damping characteristic C. To determine the rising-based damping characteristic C, given a limited amount of energy, the pickoff voltage may exhibit a logarithmic curve as it reaches the target voltage. When curve fit, this logarithmic curve may be used to estimate the damping characteristic C or some proportion of the damping characteristic C for a given meter.

As will be described in more detail below, an aggregate damping-related value may be determined based on the decay sections 430*a*, 530*a*-530*f* and the rising sections 430*b*, 630*a*-630*f*. For example, the decay sections 430*a*, 530*a*-530*f* and/or the rising sections 430*b*, 630*a*-630*f* may be used to determine, for example, an aggregate damping characteristic or an aggregate decay characteristic. The aggregate damping characteristic may be an average damping characteristic Cavg and the aggregate decay characteristic may be an average damping characteristic $\zeta$avg. With more particularity, a decay-based average damping characteristic Cavg can be determined based on the decay sections 430*a*, 530*a*-530*f* and a rising-based average damping characteristic Cavg can be determined based on the rising sections 430*b*, 630*a*-630*f*.

For example, as discussed above, the damping characteristics C of the decay sections 430*a*, 530*a*-530*f* can be determined from the decay characteristic $\zeta$ by also measuring a resonant frequency $f_0$ and determining the damping characteristic C from $M2\zeta\omega_0$, where $\omega_0=2\pi f_0$. Also as discussed above, the damping characteristic C may be based on the logarithmic curve of the rising sections 430*b*, 630*a*-630*f*. Accordingly, the damping characteristic C determined based on one or more of the decay sections 430*a*, 530*a*-530*f* and the damping characteristic C determined based on one or more of the rising sections 430*b*, 630*a*-630*f* may, for example, be averaged together to determine an average damping characteristic Cavg.

The average damping characteristic Cavg may be more repeatable, relative to each of the decay sections 430*a*, 530*a*-530*f* or rising sections 430*b*, 630*a*-630*f*. For example, as described above, the decay characteristic $\zeta$ may be determined based on pickoff voltage measurements, which may include noise. The noise may cause each of the decay sections 430*a*, 530*a*-530*f* and rising sections 430*b*, 630*a*-630*f* to vary over time even though the actual damping attributes of the meter assembly remains the same. That is, noise may cause each of the decay sections 430*a*, 530*a*-530*f* and rising sections 430*b*, 630*a*-630*f* to not be substantially repeatable. Accordingly, the average damping characteristic Cavg may be more repeatable than a damping characteristic C determined based on one of the decay sections 430*a*, 530*a*-530*f* and rising sections 430*b*, 630*a*-630*f*.

The decay and rising sections 430*a*, 430*b* of FIG. 4 are part of the response voltage plot 430, which is cyclical. Accordingly, the rising and decay sections of FIG. 4 are respectively repeated, substantially the same, and non-contiguous. By contrast, the decay and rising sections 530*a*-530*f*, 630*a*-630*f* of FIGS. 5 and 6 are of the response voltage plots 530, 630, which are not, as shown, cyclical. Accordingly, the decay and rising sections 530*a*-530*f*, 630*a*-630*f* of FIGS. 5 and 6 are contiguous, non-repeating, and distinct.

Although the above discussion regarding FIGS. 4-6 discusses average damping-related values (e.g., average damping characteristic C, average decay characteristic $\zeta$avg, etc.), any suitable damping-related value may be employed. For example, a value that is damping-related, but is not the decay characteristic or the damping characteristic, may be employed. Additionally or alternatively, the aggregate damping-related value may be something other than an average value. For example, the aggregate damping-related value may be a mean, weighted-average, etc. Additionally or alternatively, the aggregate damping-related value may be determined in any suitable manner. For example, subsets of the decay and rising sections 430*a*, 430*b*, 530*a*-530*f*, 630*a*-630*f* may be used to determine the average damping-related value. In one particular example, thresholds may be used to exclude some of the decay and rising sections 430*a*, 430*b*, 530*a*-530*f*, 630*a*-630*f* if exceeded due to, clearly erroneous or corrupted, data.

Figure 7:
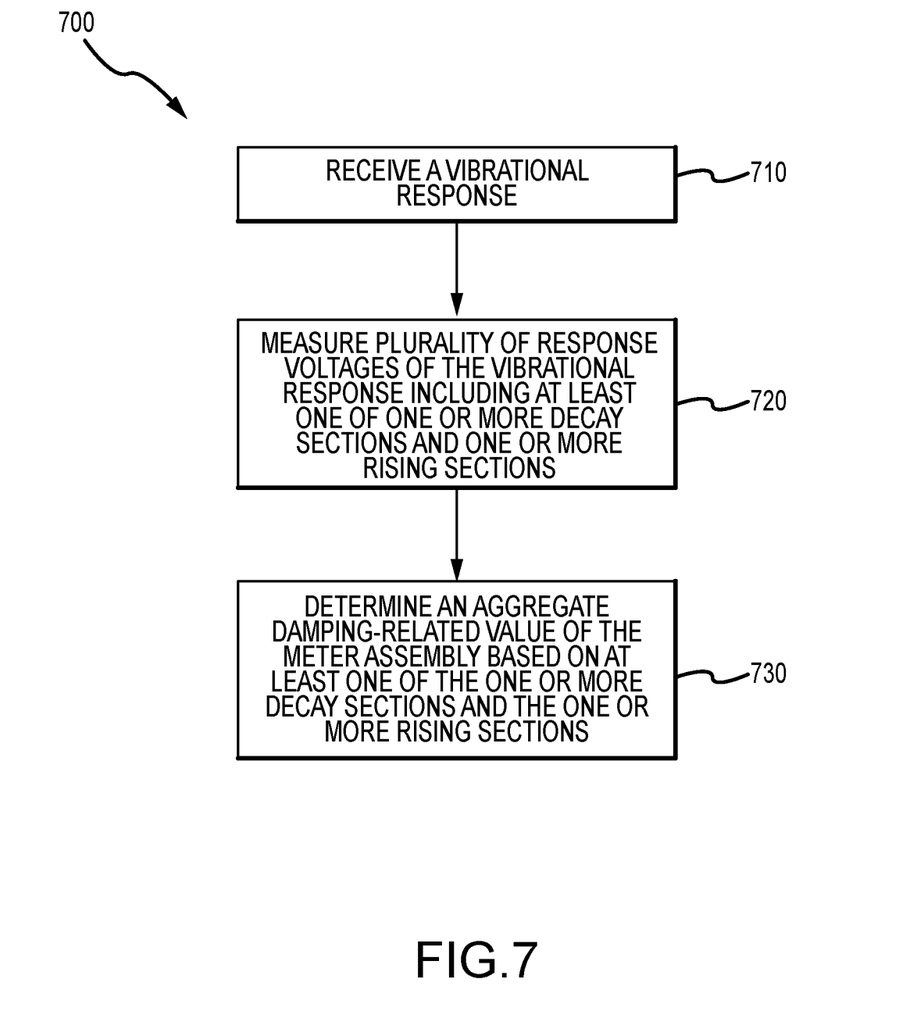
FIG. 7 shows a method 700 of determining a damping characteristic of a meter assembly.

FIG. 7 shows a method 700 of determining a damping characteristic of a meter assembly. As shown in FIG. 7, the method 700 includes receiving a vibrational response in step 710. The vibrational response may be received by the interface 201 in the meter electronics 20 described above. In step 720, the method 700 measures a plurality of response voltages of the vibrational response. The plurality of response voltages may be measured by the interface 201 and/or processing system 203 described above. The plurality of response voltages may include one or more decay sections and one or more rising sections. In step 730, the method 700 can determine an aggregate damping-related value of a meter assembly, such as the meter assembly 10 described above. The aggregate damping-related value may be determined based on at least one of the one or more decay sections and the one or more rising sections.

In one example, at least one of the one or more decay sections and the one or more rising sections are a cyclical response voltage plot. For example, with reference to FIG. 4, the decay and rising sections 430*a*, 430*b* are part of the response voltage plot 430, which is cyclical. In another example, the one or more decay sections are of a response voltage decay curve and the one or more rising sections are of a response voltage rising curve. For example, with reference to FIGS. 5 and 6 decay and rising sections 530*a*-530*f*, 630*a*-630*f* are of the response voltage plots 530, 630, which are respectively a response voltage decay curve and a response voltage rising curve.

The aggregate damping-related value of the meter assembly may be an aggregate decay characteristic value of the meter assembly based on the one or more decay sections. For example, a decay-based average damping characteristic Cavg can be determined based on the decay sections 430*a*, 530*a*-530*f* respectively shown in FIGS. 4 and 5. The method may also determine a damping characteristic based on the aggregate decay characteristic value. For example, a decay-based average damping characteristic Cavg can be determined based on the decay sections 430*a*, 530*a*-530*f*. Additionally or alternatively, the aggregate decay characteristic value may be an average of fractional decay characteristics respectively corresponding to the one or more decay sections.

The aggregate damping-related value of the meter assembly may be an aggregate damping characteristic value of the meter assembly. For example, the aggregate damping characteristic may be an average damping characteristic Cavg. That is, the aggregate damping characteristic value of the meter assembly may be comprised of an average damping characteristic of the meter assembly.

The foregoing describes the meter electronics 20 and the method 700 that can determine a damping of a meter assembly of a flow meter, such as the meter assembly 10 and flow meter 5 described above. The damping of the meter assembly 10 can be determined from one or more decay sections 430a, 530a-530f or one or more rising sections 430b, 630a-630f. For example, an aggregate damping-related value can be determined from the one or more decay sections 430a, 530a-530f or one or more rising sections 430b, 630a-630f. Because the aggregate damping-related value is determined from the one or more decay sections 430a, 530a-530f or one or more rising sections 430b, 630a-630f, noise, or other spurious data corruption may not cause as significant of a variation in the determined damping of the meter assembly, thereby ensuring a more repeatable meter verification.

Accordingly, the technical solution that includes, among other things, determining an aggregate damping-related value of the meter assembly based on at least one of the one or more decay sections 430a, 530a-530f and the one or more rising sections 430b, 630a-630f, can be used to solve a technical problem of, for example, noise in response voltage plots 430, 530, 630 that can cause inaccurate determinations of a damping of a meter assembly.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other electronics and methods that determine a damping of a meter assembly and not just to the embodiments described above and shown in the accompanying figures. Accordingly, the scope of the embodiments described above should be determined from the following claims.

We claim:

1. A meter electronics (20) for determining a damping of a meter assembly (10) of a flow meter (5), the meter electronics (20) comprising an interface (201) for receiving a vibrational response from a meter assembly (10), the vibrational response comprising a response to an excitation of the meter assembly (10) at a substantially resonant frequency, and a processing system (203) comprising a storage system (204) including a routine and a process device in communication with the interface (201), the storage system (204) and the routine being configured to cause the meter electronics (20) to:
   receive the vibrational response from the interface (201);
   measure a plurality of response voltages (V) of the vibrational response, the plurality of response voltages (V) including one or more decay sections (430a, 530a-530f) and one or more rising sections (430b, 630a-630f); and
   determine an aggregate damping-related value of the meter assembly (10) based on a decay characteristic ($\zeta$) value determined from the one or more decay sections (430a, 530a-530f) and a damping characteristic (C) value determined from the one or more rising sections (430b, 630a-630f).

2. The meter electronics (20) of claim 1, wherein at least one of the one or more decay sections (430a, 530a-530f) and the one or more rising sections (430b, 630a-630f) are a cyclical response voltage plot (430, 530, 630).

3. The meter electronics (20) of claim 1, wherein the one or more decay sections (530a-530f) are of a response voltage decay curve and the one or more rising sections (630a-630f) are of a response voltage rising curve.

4. The meter electronics (20) of claim 1, wherein the decay characteristic ($\zeta$) value is an aggregate decay characteristic value of the meter assembly (10) based on the one or more decay sections (430a, 530a-530f).

5. The meter electronics (20) of claim 4, wherein the processing system (203) is further configured to determine a damping characteristic based on the aggregate decay characteristic value.

6. The meter electronics (20) of claim 4, wherein the aggregate decay characteristic value is an average of fractional decay characteristics respectively corresponding to the one or more decay sections (530a-530f).

7. The meter electronics (20) of claim 1, wherein the aggregate damping-related value of the meter assembly (10) is an aggregate damping characteristic value of the meter assembly (10).

8. The meter electronics (20) of claim 7, wherein the aggregate damping characteristic value of the meter assembly (10) is comprised of the average damping characteristic of the meter assembly (10).

9. A method for determining a damping of a meter assembly of a flow meter, the method comprising receiving a vibrational response from a meter assembly, the vibrational response comprising a response to a vibration of the meter assembly at a substantially resonant frequency, with the method further comprising:
   receiving the vibrational response;
   measuring a plurality of response voltages of the vibrational response, the plurality of response voltages including one or more decay sections and one or more rising sections; and
   determining an aggregate damping-related value of the meter assembly based on a decay characteristic ($\zeta$) value determined from the one or more decay sections and a damping characteristic (C) value determined from the one or more rising sections.

10. The method of claim 9, wherein at least one of the one or more decay sections and the one or more rising sections are a cyclical response voltage plot.

11. The method of claim 9, wherein the one or more decay sections are of a response voltage decay curve and the one or more rising sections are of a response voltage rising curve.

12. The method of claim 9, wherein the decay characteristic ($\zeta$) value is an aggregate decay characteristic value of the meter assembly based on the one or more decay sections.

13. The method of claim 12, further comprising determining a damping characteristic based on the aggregate decay characteristic value.

14. The method of claim 12, wherein the aggregate decay characteristic value is an average of fractional decay characteristics respectively corresponding to the one or more decay sections.

15. The method of claim 9, wherein the aggregate damping-related value of the meter assembly is an aggregate damping characteristic value of the meter assembly.

16. The method of claim 15, wherein the aggregate damping characteristic value of the meter assembly is comprised of average damping characteristic of the meter assembly.

* * * * *